United States Patent
Patil et al.

(10) Patent No.: US 10,721,322 B2
(45) Date of Patent: Jul. 21, 2020

(54) PREFETCHING WITH A DYNAMIC CLOUD PACKAGER

(71) Applicant: Verizon Digital Media Services Inc., Dulles, VA (US)

(72) Inventors: Ravikiran Patil, Los Angeles, CA (US); Seungyeob Choi, Northridge, CA (US)

(73) Assignee: Verizon Digital Media Services Inc., Dulles, VA (US)

(*) Notice: Subject to any disclaimer, the term of this patent is extended or adjusted under 35 U.S.C. 154(b) by 823 days.

(21) Appl. No.: 15/297,449

(22) Filed: Oct. 19, 2016

(65) Prior Publication Data

US 2018/0109643 A1    Apr. 19, 2018

(51) Int. Cl.
*H04L 29/06*   (2006.01)
*H04L 29/08*   (2006.01)

(52) U.S. Cl.
CPC ...... *H04L 67/2847* (2013.01); *H04L 65/4084* (2013.01); *H04L 65/605* (2013.01)

(58) Field of Classification Search
CPC ............... H04L 65/4084; H04L 65/605; H04L 67/2847
See application file for complete search history.

(56) References Cited

U.S. PATENT DOCUMENTS

| 9,729,594 B2* | 8/2017 | Price ................. H04L 29/06027 |
| 2015/0012608 A1* | 1/2015 | Ishikawa ................. H04L 67/28 709/213 |
| 2015/0188974 A1* | 7/2015 | Garcia-Mendoza Sanchez .......... G06F 16/2282 709/231 |

* cited by examiner

*Primary Examiner* — Jason D Recek
(74) *Attorney, Agent, or Firm* — Ansari Katiraei LLP; Arman Katiraei; Sadiq Ansari (57) ABSTRACT

Provided is an intelligent prefetcher for prefetching media content segments following a non-sequential naming convention. The prefetching is initiated in response to a server receiving a user request for a particular segment that is not cached. The server passes the request to an origin. The origin scans metadata of a file from which the particular segment is produced. The scanning identifies time or frame offsets for subsequent segments to be prefetched. The origin constructs the requested segment and includes in the segment header, identifiers corresponding to the offset of each subsequent segment selected for prefetching. The segment passes to the server. The server detects the modified header and generates prefetch requests based on each identifier in the modified header. The server issues the prefetch request to the origin and caches the prefetched segments returned by the origin for distribution in response to subsequent user requests for the prefetched segments.

17 Claims, 7 Drawing Sheets

PREFETCHING WITH A DYNAMIC CLOUD PACKAGER

BACKGROUND ART

Media content consumption continues shifting from traditional broadcasting to online or Internet based consumption. As a result, online media content providers are continually expanding and optimizing their resources and bandwidth in order to meet the increasing demand and increased expectations for quality and user experience.

Online media content is typically encoded in a source or master file. A transmuxer breaks the source or master file into several segments. Each segment encodes a different chunk or temporal duration of the media content. The segments can be requested independent of one another. Accordingly, servers retrieve and send the segments that are requested by a user rather than the entire media content file. The media content segmenting reduces server load, the cache footprint consumed by the media content, and wasted resources and bandwidth in unnecessarily retrieving parts of the media content that are not requested by users. The media content segmenting further simplifies starting or resuming playback at different points in the media content stream as users can request segments at specific temporal durations.

Prior art transmuxers create segments that are of equal length. This regimented creation of segments results in segments with start times that do not necessarily align with key frames or I-frames from the source or master file providing the original and complete encoding for the media content. Nevertheless, each segment must start with a key frame. Accordingly, the transmuxers encode each segment independent of the original media content encoding. Segment encoding results in quality loss as each encoding iteration is a lossy process. Segment encoding also introduces delays in readying the segments for delivery because of the involved processing overhead. These delays can degrade media content delivery performance and the user experience, especially when the segment creation is performed directly in response to received user requests.

Some transmuxers have identified these inefficiencies and have optimized the segment creation to avoid the segment encoding steps. To do so, the transmuxers commence the segments at existing key frame locations in the source or master file providing the original encoding for the media content. Each segment can then be formed from the existing encoded binary data of an existing key frame and a subsequent set of frames that follows the key frame commencing the segment.

A byproduct of creating segments that commence at existing key frame locations is that the segments will no longer be of equal length because of their dependence on key frame encoding within the master or source file. This affects the naming convention used for requesting the segments. Segments of equal length could be identified by a simple numerical sequence. In other words, each segment name is appended with a different sequence number that maps to the segment start offset or time (e.g., sequence number 0 corresponds to first segment, sequence number 1 corresponds to segment starting at the five second offset, sequence number 2 corresponds to the segment starting at the ten second offset, etc.). However, segments of unequal or differing length cannot be identified with such a sequential naming convention as the sequence number does not consistently map to the key frame locations at which the segments commence.

A new naming convention is therefore used to identify and request segments commencing at existing key frames within an original and complete encoding of media content. The new naming convention involves providing a non-sequential identifier representing the time or frame offset for the key frame at which the segment commences.

A segment naming convention that does not involve the sequential numbering of segments is however incompatible with existing server prefetching mechanisms. Without a sequential naming convention, the server is unable to generate a prefetch request for requesting a next segment following a current segment requested in a user issued request. More specifically, the server cannot produce the name or request for the next segment using only the name or request for the current segment. Thus, optimizing segment creation to avoid segment encoding breaks prefetching that is reliant on a sequential naming convention.

There is therefore a need to provide prefetching for segments that do not follow a sequential naming convention. More specifically, there is a need to provide prefetching for segments generated from irregular key frame placement within an original and complete encoding of media content.

BRIEF DESCRIPTION OF THE DRAWINGS

A preferred embodiment for prefetching media content segments generated according to a non-sequential naming convention will now be described, by way of example only, with reference to the accompanying drawings in which.

DETAILED DESCRIPTION

The embodiments provide a standalone or distributed prefetcher for prefetching live or on-demand media content segments or files without a sequential naming convention. In some such embodiments, prefetching involves requesting the segments or files with identifiers that correspond to irregularly placed key frames from a source or master file providing an original and complete encoding of the particular media content. In some embodiments, each identifier used in requesting a particular segment specifies a different time or frame offset that maps to the key frame within the particular media content encoding at which the particular segment commences.

Figure 1:
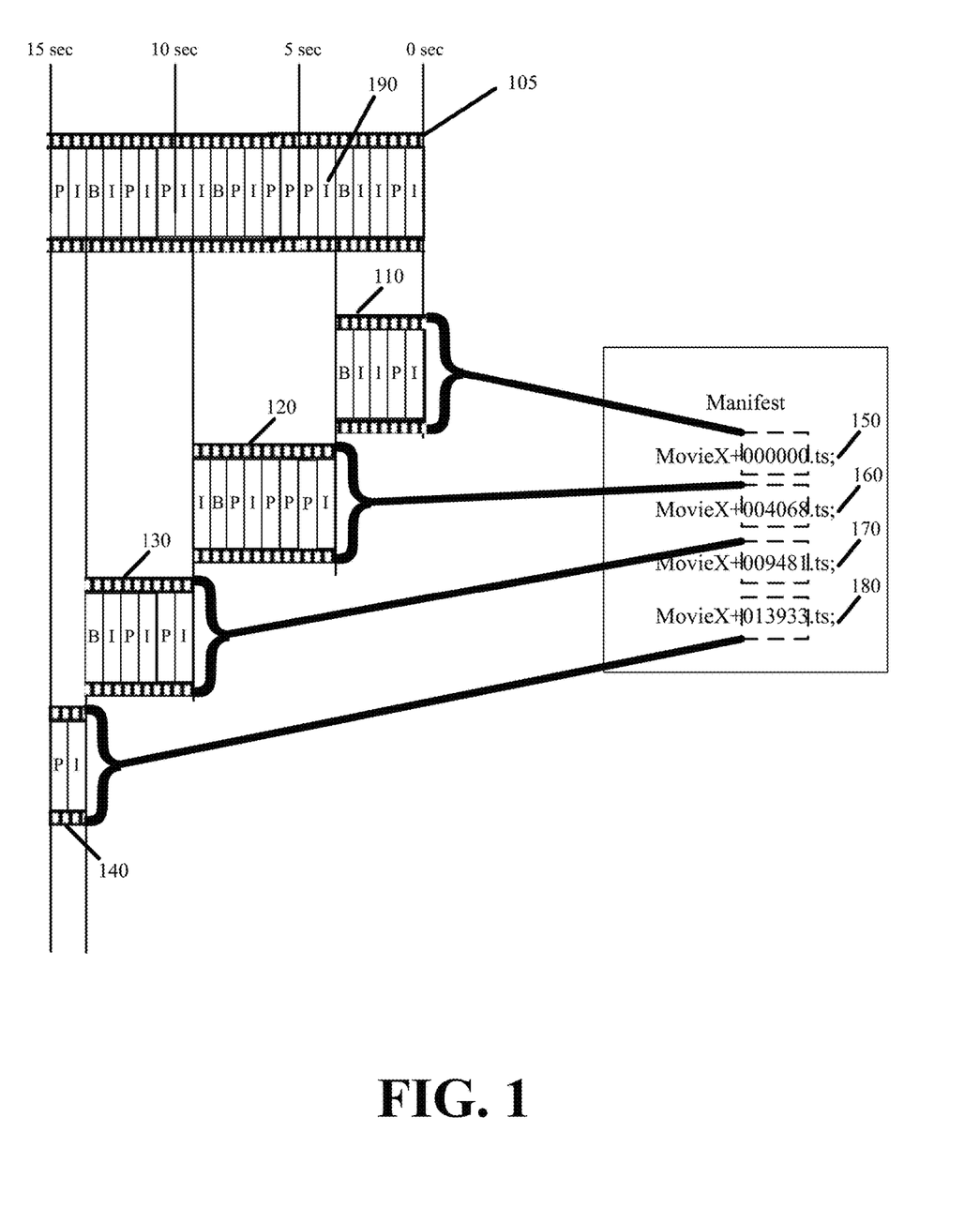
FIG. 1 illustrates a non-sequential segment naming convention for the disclosed prefetching embodiments.

FIG. 1 illustrates a non-sequential segment naming convention for the prefetching embodiments set forth herein. The figure illustrates a particular media content encoded file 105, four segments 110, 120, 130, and 140 produced from transmuxing the file 105, and a manifest that specifies the non-sequential segment identifiers 150, 160, 170, and 180 for requesting each of the segments 110, 120, 130, and 140.

The particular media content encoded file 105 is formed from an irregular mix of I, P, B, and other frame types. The I frames are key frames that can be rendered using the information in the key frame without referencing any information from other frames in the same segment or a different segment, whereas P-frames or B-frames reference information from frames before or after, and are therefore incomplete by themselves.

The key frames at which the segments 110, 120, 130, and 140 commence are approximately a segment duration parameter apart. In other words, the segments are defined to have a duration that is close to the segment duration parameter but not necessarily equal to the segment duration parameter for all segments as a result of the irregular placement of the key frames in the particular media content encoded file 105.

The segment identifiers 150, 160, 170, and 180 are alphanumeric values that are appended to a base name of the particular media content. The alphanumeric values specify different offsets. Each offset corresponds to a different key frame at which one of the four segments 110, 120, 130, and 140 commences in the encoded file 105. For instance, segment identifier 160 specifies an offset that maps to key frame 190 from the encoded file 105 at which the second segment 120 commences. In this figure, the segment identifiers 150, 160, 170, and 180 correspond to time offsets. In some embodiments, frame offsets and other values mapping to the segment key frame positions can be used for the segment identifiers 150, 160, 170, and 180.

In some embodiments, the prefetching works in conjunction with media content encoded files that store metadata separately from binary data. An mp4 file is an example of a media content encoded file that stores metadata in a "moov" section of the file format and stores binary data in a separate "mdat" section of the file.

The metadata includes information relating to how the binary data is constructed. The metadata can define one or more of the frame composition for the binary data, frame resolution, media content duration, frames per second, and offsets for the different media content frames as some examples.

The binary data stores the video alone or in conjunction with the audio information for the media content. More specifically, the binary data stores the information for the I, P, B, and other frames from which the media content is formed.

Figure 2:
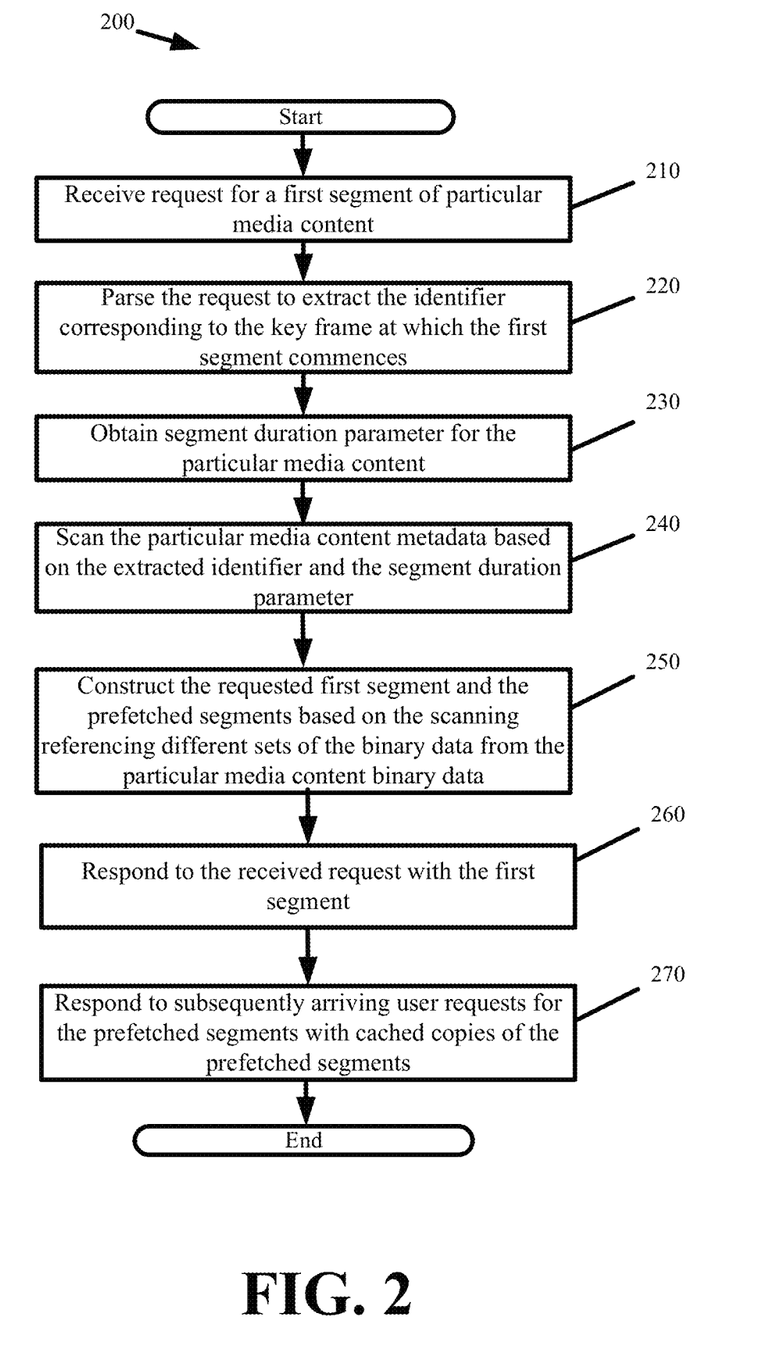
FIG. 2 presents a process performed by a standalone prefetcher of some embodiments for prefetching media content segments without a sequential naming convention.

FIG. 2 presents a process 200 performed by a standalone prefetcher of some embodiments for prefetching media content segments without a sequential naming convention. In some embodiments, the standalone prefetcher is a single machine that receives a user issued request for a particular segment and, in response to the received request, prefetches subsequent segments directly from the source or master file providing the original and complete encoding of the media content.

The process 200 commences with the prefetcher receiving (at 210) a request for a first segment of particular media content from a user. The first segment need not be the initial segment commencing the particular media content, but rather any segment that is first requested by the user.

The process parses (at 220) the request to extract the identifier corresponding to the key frame at which the first segment commences. As noted in FIG. 1, the identifier can be appended to the particular media content base name with a delimiter. The delimiter can include "+", "&", "#", or other symbols or characters that simplify the identifier identification and extraction. In some other embodiments, the prefetcher performs pattern matching to extract the identifier from the request.

The process obtains (at 230) a segment duration parameter for the particular media content. The segment duration parameter can be a configured value used in producing the segments from the particular media content. In some embodiments, different segment duration parameters are used in producing the segments for media content of different media content providers. As noted above, the segment duration parameter sets the approximate length of each segment by controlling which key frame from the original media content encoding is selected to commence the different segments.

The process scans (at 240) the particular media content metadata based on the extracted identifier and the segment duration parameter. The scanning involves mapping the extracted identifier to the key frame for the requested first segment and then using the segment duration parameter to identify the key frames for one or more subsequent segments that are to be prefetched.

Figure 3:
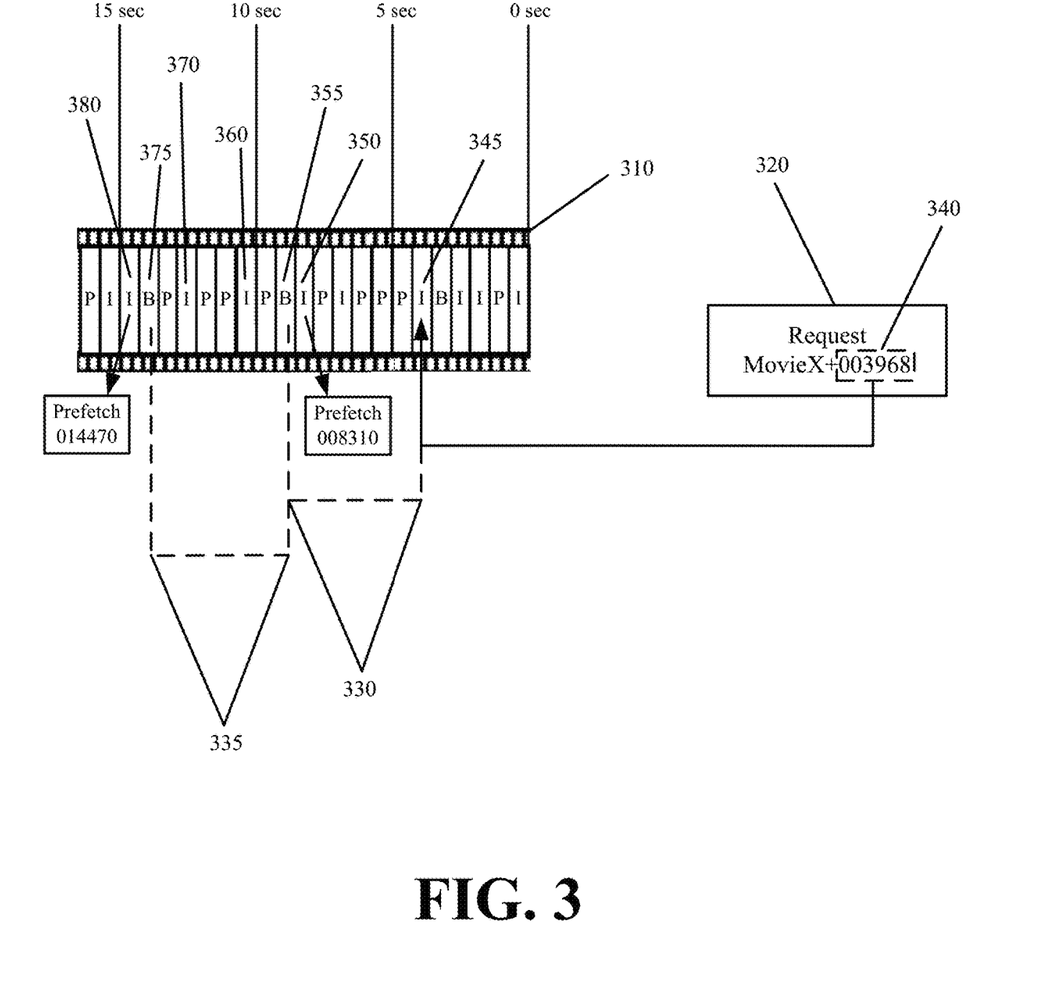
FIG. 3 conceptually illustrates scanning the particular media content metadata in order to identify key frames at which different segments commence.

FIG. 3 conceptually illustrates scanning the particular media content metadata 310 in order to identify key frames at which different segments commence. In this figure, the metadata 310 conceptually identifies the sequence of frames that represent the encoded binary data. The figure also depicts a request 320 with an identifier 340 for requesting a particular segment of the particular media content and a segment duration parameter of 5 seconds (i.e., reference markers 330 and 335). Not shown in FIG. 3 is the binary data encoding the video and optionally audio of the particular media content.

The identifier 340 maps to a first key frame 345 as the key frame at which the particular requested segment commences. Scanning ahead in the metadata 310 by the segment duration parameter 330 identifies a second key frame 350 before the offset 355 referenced by the segment duration parameter and a third key frame 360 after the offset 355 referenced by the segment duration parameter. Since, the second key frame 350 is closer than the third key frame 360 to the offset 355 referenced by the segment duration parameter 330, the second key frame 350 is the key frame at which a first prefetched segment commences. The prefetcher computes the offset of the second key frame 350 within the particular media content encoded file. The second key frame offset then becomes the identifier for requesting or extracting the first prefetched segment.

The scanning continues to identify a fourth key frame 370 before the offset 375 referenced by two measures of the segment duration parameter 335 and a fifth key frame 380 after the offset 375 referenced by two measures of the segment duration parameter 335. The fifth key frame 380 is closer than the fourth key frame 370 to the segment duration parameter referenced offset 335. Accordingly, the prefetcher computes the offset of the fifth key frame 380 within the particular media content encoded file. The fifth key frame offset becomes the identifier for requesting or extracting the second prefetched segment.

Figure 4:
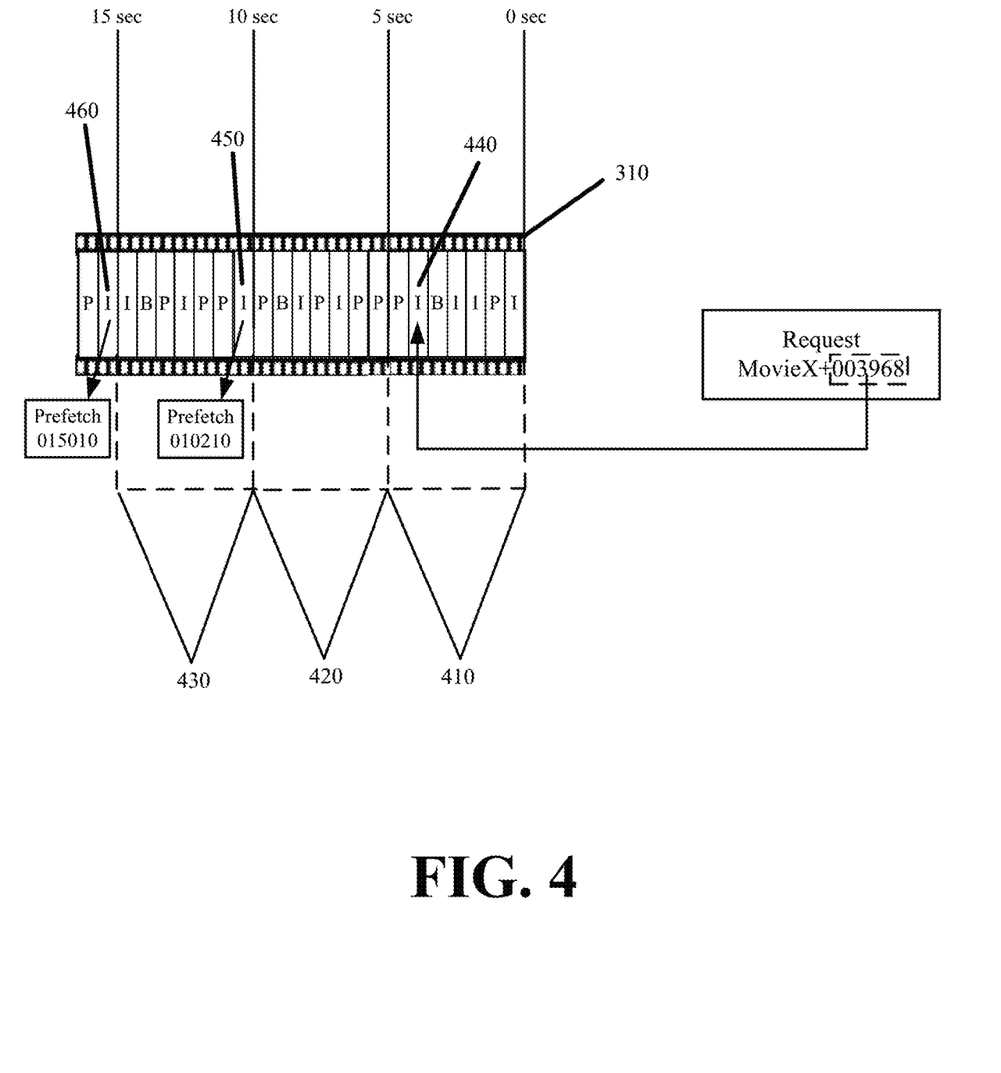
FIG. 4 illustrates an alternative scanning of the particular media content metadata in order to identify key frames at which different segments commence.

FIG. 4 illustrates an alternative scanning of the particular media content metadata in order to identify key frames at which different segments commence. Whereas FIG. 3 extended the segment duration parameter from a key frame of a previous segment in order to identify the key frame for a next segment, FIG. 4 extends the segment duration parameter from an offset determined by a prior extension of the segment duration (see reference markers 410, 420, and 430)

irrespective of the offset for the key frame of the previous segment (see reference markers 440 and 450). Even though the sequence of frames and the segment duration parameter is the same, the different metadata scanning performed in FIG. 4 results in the starting key frames for the second 450 and third 460 segments differing from those of FIG. 3. FIGS. 3 and 4 illustrates two of several possible implementations for identifying the offsets or key frames for segments to be prefetched in accordance with some embodiments.

It is important to note that the scanning is relegated to the metadata of the particular media content encoded file and not the binary data, and the scanning is further relegated to the portion identified by the extracted identifier through to the key frame locations for the one or more next segments to prefetch. In other words, if the metadata contained key frame information for 100 segments and the extracted identifier references the 54th segment, the metadata scanning would be limited to the metadata for the 54th segment and the subsequent segments that are to be prefetched (e.g., 55th and 56th segments).

Returning to process 200, the process constructs (at 250) the requested first segment and the prefetched segments. The process constructs the segments based on the metadata scanning. The metadata scanning reveals the byte offsets to each frame. The offsets for the different segments can be derived from the frame byte offsets. The process maps the offsets to different sets of binary data from the particular media content encoded file. Additional metadata from the metadata scanning, including the frames per second, can also factor in the mapping of the segment identifier offsets to the different sets of binary data. Each set of binary data corresponds to a different segment. Therefore, the process directly copies each set of binary data in order to generate each segment. For instance, the process constructs the requested first segment by copying from the binary data of the particular media content encoded file, the first bit corresponding to the key frame of the first segment up to, but not including the first bit corresponding to the key frame of the next segment. In some embodiments, the process produces the metadata for each generated segment.

The process responds (at 260) to the request received at 210 with the current requested segment. The process caches the prefetched segments so that the prefetcher can respond (at 270) to subsequently arriving user requests for the prefetched segments with cached copies of the prefetched segments without having to once again scan the metadata and copy the binary data for the requested segments.

The embodiments above provide a standalone implementation for prefetching and delivering media content. In other words, the prefetcher receives the user request, performs the prefetching, and responds to the user request. Some embodiments adapt the prefetching for a distributed architecture.

Figure 5:
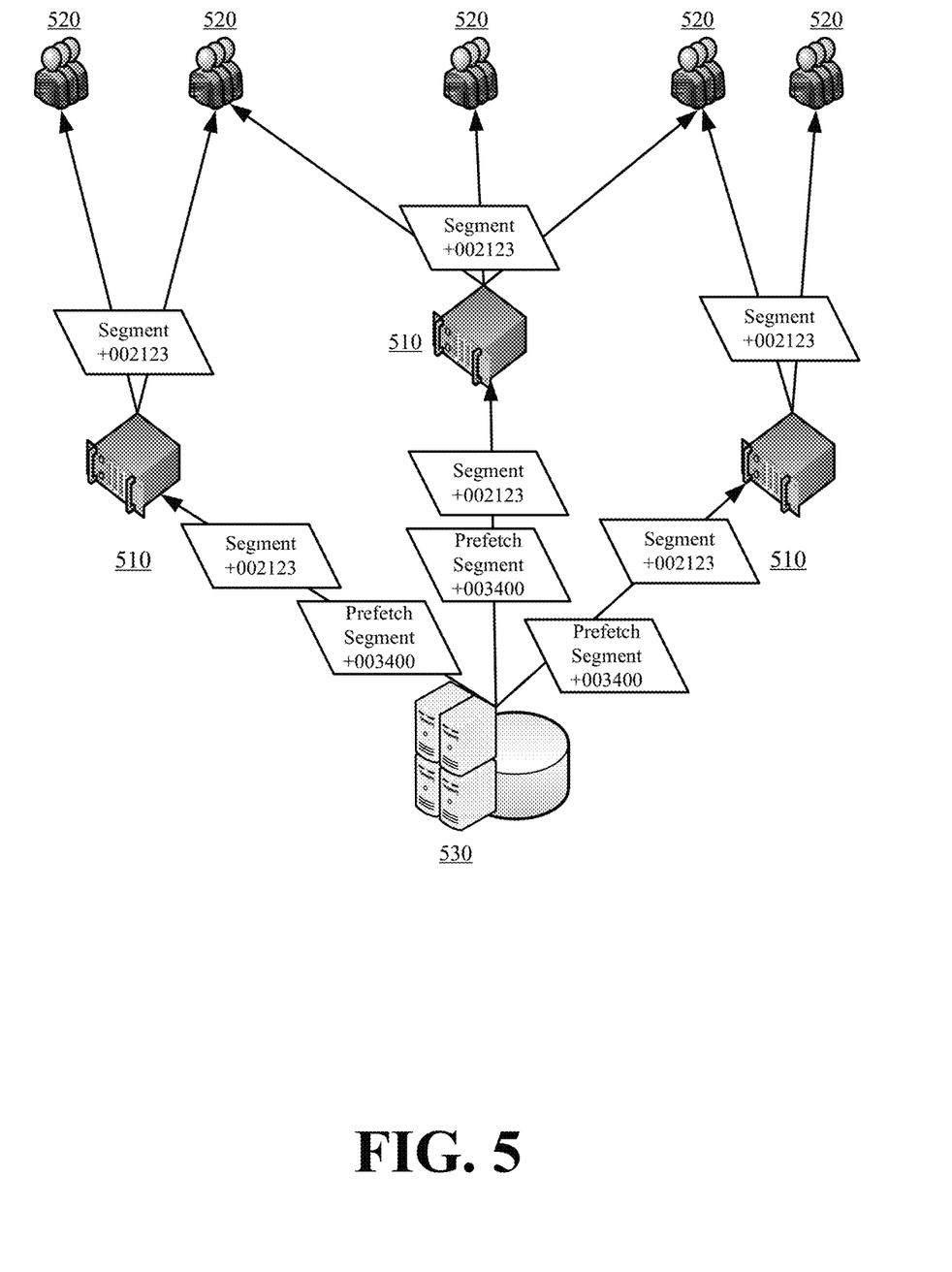
FIG. 5 illustrates a distributed architecture for prefetching and delivering media content in accordance with some embodiments.

FIG. 5 illustrates a distributed architecture for prefetching and delivering media content in accordance with some embodiments. In FIG. 5, one or more media content distribution servers 510 receive requests for different segments of particular media content from users 520 and respond to the requests by serving the requested segments. The media content distribution servers 510 do not however store the original and complete encoding of the particular media content. Instead, the media content distribution servers 510 retrieve the requested segments from an origin 530, wherein the origin 530 stores the particular media content encoded file. The media content distribution servers 510 also prefetch at least one next segment from the origin 530 in response to the received user requests.

The media content distribution servers 510 fan out the segments to the requesting users 520. In some embodiments, the media content distributions servers 510 also temporarily cache the requested and prefetched segments so that they can be served in response to subsequently received user requests.

This distributed architecture eliminates unnecessary and redundant storage of the particular media content and redundant storage and creation of the segments across the media distribution servers 510. This increases the cache footprint of the media distribution servers 510 and removes much of the processing overhead associated with the segment creation from the media distribution servers 510. The distributed architecture causes the prefetching to become a coordinated effort between the media distribution servers 510 and the origin 530. In some such embodiments, a front-end prefetching daemon or service runs on or in conjunction with the media distribution servers 510 and a back-end prefetching daemon or services runs on or in conjunction with the origin 530.

Figure 6:
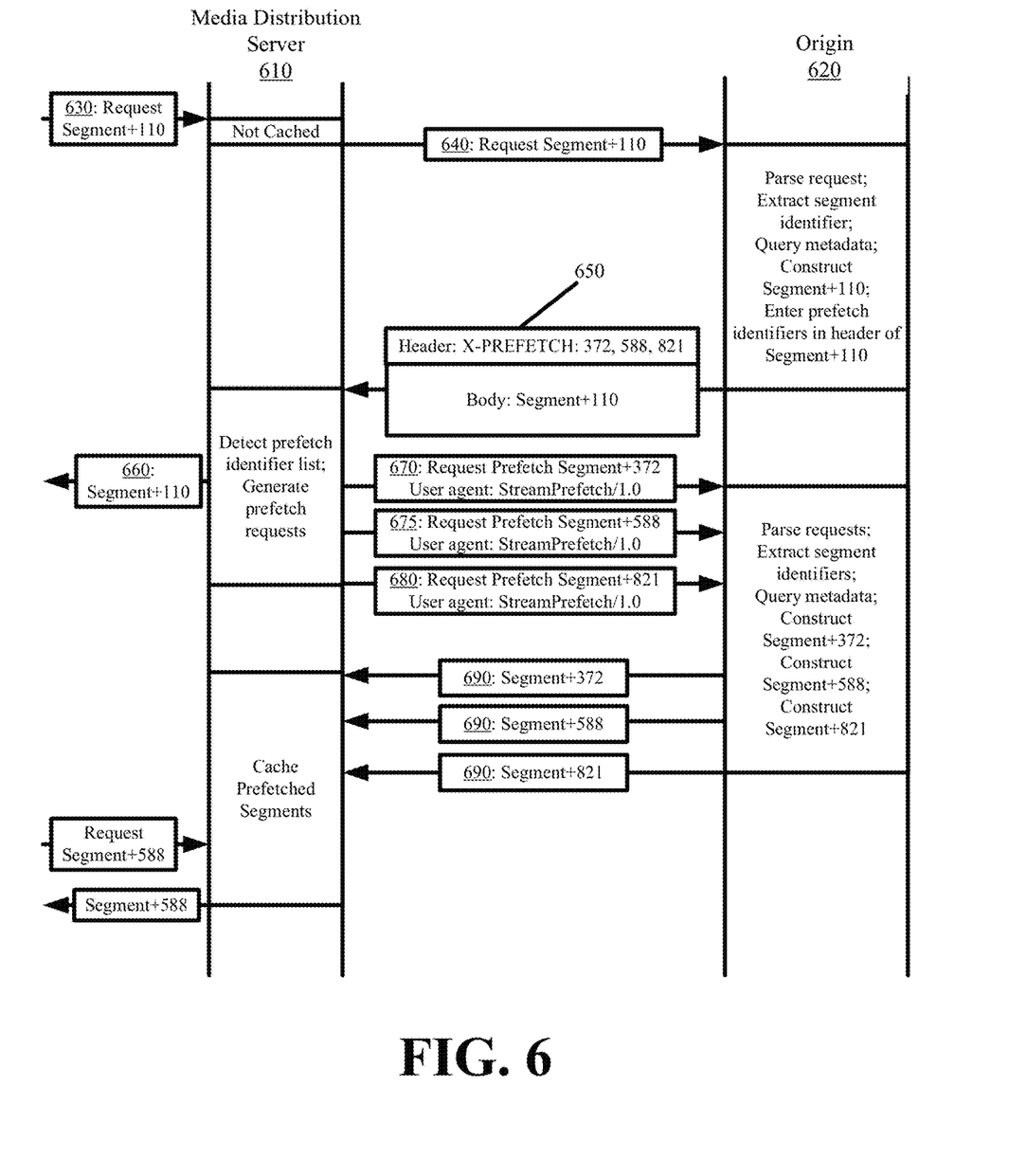
FIG. 6 illustrates prefetching within a distributed architecture in accordance with some embodiments.

FIG. 6 illustrates prefetching within a distributed architecture in accordance with some embodiments. The figure illustrates prefetching performed by and between a media distribution server 610 and an origin 620, wherein the origin 620 stores a source or master file providing an original and complete encoding of the particular media content.

The server 610 receives (at 630) a request for a first segment of the particular media content. The server 610 does not have a local copy of the first segment. Accordingly, the server 610 passes (at 640) the first segment request to the origin 620.

The origin 620 parses the request to extract the identifier corresponding to the key frame at which the first segment commences. The origin 620 queries the metadata of the particular media content encoded file using the extracted identifier and a segment duration parameter for the particular media content. The origin 620 identifies the key frame at which the first frame commences from querying the metadata with the extracted identifier. In this figure, the origin 620 is also configured to initiate prefetching for three subsequent segments. Accordingly, the origin 620 further identifies the key frames at which subsequent second, third, and fourth segments commence from continuing the querying with the segment duration parameter as per FIG. 3 or FIG. 4 above. The number of segments to prefetch can be a configurable parameter. The configurable parameter be defined as part of customer-specific configuration file stored at the media distribution server 610. In some embodiments, the media distribution server 610 retrieves the customer-specific configuration file in response to the request received at 630, extracts the configurable parameter from the configuration file, and enters the configurable parameter in the header of the request passed from the server 610 to the origin 620 at 640.

The origin 620 constructs the first segment by copying a set of binary data from the particular media encoded file, wherein the set of binary data is referenced by the first segment starting key frame and the metadata scanning. The origin 620 further generates identifiers for requesting the second, third, and fourth segments by computing offsets based on the identified key frames at which each of the second, third, and fourth segments commence. The origin 620 enters the request prefetch identifiers into headers of the first segment. The origin 620 then sends (at 650) the first segment response with the modified header to the media distribution server 610. As shown at 650, the origin 620 enters the request identifiers for prefetching the second, third, and fourth segments as a comma separated list into a custom header field of the first segment response (i.e., X-PREFETCH). In some other embodiments, the origin 620 repurposes existing header fields of the first segment to carry the request identifier.

The server 610 receives the first segment response. The server 610 reads the modified header from the first segment response contemporaneous with the media distribution server sending (at 660) the first segment response to the requesting user. In some embodiments, the server 610 removes the prefetch identifiers from the header of the first segment response prior to sending to the requesting user. In some other embodiments, the server 610 does not alter the header field listing the prefetch identifiers prior to sending the first segment response to the requesting user.

The server 610 generates prefetch requests based on each identifier entered in the first segment response header. In this figure, the origin 620 entered three identifiers for the second, third, and fourth segments. Accordingly, the server 610 appends each identifier to the particular media content base name in order to generate the requests to prefetch the second, third, and fourth segments.

In some embodiments, the server 610 modifies the header of each prefetch request to signal to the origin 620 that the requests are prefetch requests and to differentiate the prefetch requests from user issued requests. The differentiation and identification of a prefetch request signals to the origin 620 that the origin 620 should not initiate further prefetching by including identifiers for subsequent segments in the responses to the prefetch requests. In other words, the server 610 modifies the prefetch request headers to prevent a runaway prefetching scenario and to limit prefetching only in response to user issued requests for uncached segments that have not been prefetched. In FIG. 6, the server 610 modifies the user agent field of each prefetch request with a value "StreamPrefetch/1.0" to identify that the request is a prefetch request. Other embodiments repurpose or set a custom header to differentiate a prefetch request from a user initiated request. The server 610 issues (at 675) a first prefetch request for the second segment, issues (at 680) a second prefetch request for the third segment, and issues (at 685) a third prefetch request for the fourth segment to the origin 620 prior to the server 610 receiving user requests for either of the second, third, or fourth segments.

In response to each prefetch request, the origin 620 once again queries the particular media content metadata to identify the set of binary data corresponding to each prefetch requested segment and to construct the segments using the existing binary data sets. The origin also detects the modified header or user agent field in each prefetch request. In response, the origin does not perform the prefetching operations for further querying the particular media content metadata and generating the identifiers for subsequent or next segments to pass in the response segment headers. The origin responds (at 690) to each prefetch request by passing the corresponding segment back to the server 610.

The server 610 caches or temporarily stores the prefetched segments. The server 610 can then respond to subsequent user requests for the prefetched segments with the cached copies and without further access to the origin 620.

Should the server 610 receive a request for a segment not included in the prefetched segments, the server 610 will restart the operations depicted in FIG. 6. In particular, the server 610 passes the user issued request to the origin 620 which causes the origin 620 to return the requested segment with a modified header providing identifiers for subsequent segments that the server 610 can prefetch.

The prefetching does not extend past prefetching the final segment of the requested media content. Accordingly, if only the last segment remains and prefetching is configured to prefetch three segments, the origin simply enters the identifier of the last segment in its response to a server. The server is then limited to submitting a prefetch request for the last segment based on the single identifier provided in the origin response.

Some embodiments combine the prefetching with a peer cache fill implementation to limit the number of origin accesses. The peer cache filling is invoked when one or more servers contemporaneously receive different requests for the same particular segment.

Invocation of peer cache filling causes a particular server that receives the first request for the particular segment to pass the request to the origin while other requests for the particular segment subsequently arriving at the particular server or other servers are buffered without passing to the origin. The origin provides the particular segment to the particular server in response to the passed first request along with the modified header with identifiers for one or more segments to be prefetched.

The particular server removes the prefetch segment identifiers from the header before redistributing the particular segment across the buffered requests. The redistribution may involve providing copies of the particular segment to other servers that have also received and buffered requests for the same particular segment.

The peer cache filling also causes the particular server to initiate prefetching based on the identifiers in the particular segment header. The particular server generates and sends prefetch requests to the origin. Since the particular server removed the prefetch segment identifiers from the header of the segment redistributed to the other servers, the other servers are unable to redundantly initiate prefetching.

The origin sends the prefetched segments to the particular server. The particular server can then redistribute the prefetched segments to the other servers or cache the prefetched segments until any one of the servers receives a request for any of the prefetched segments.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
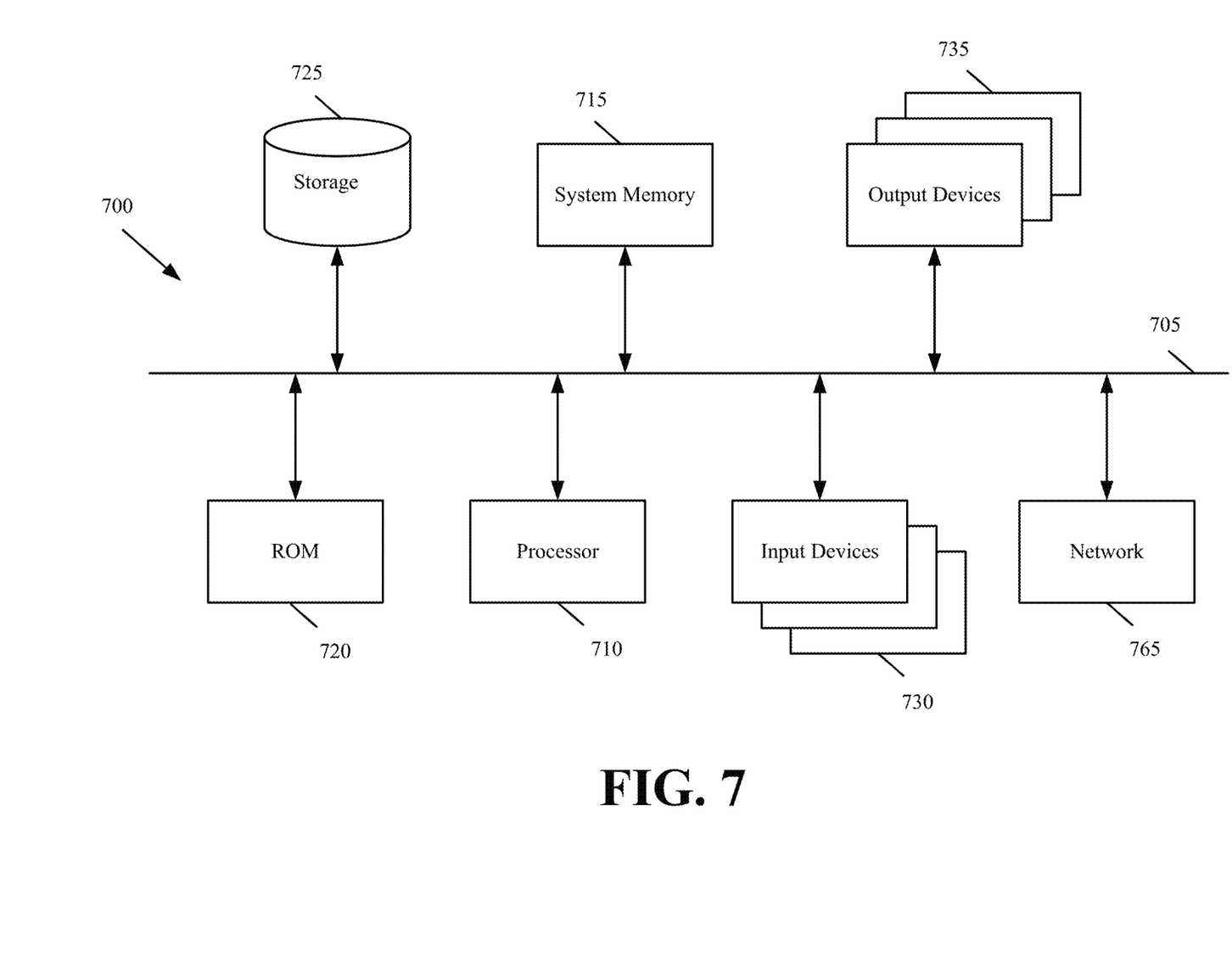
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., prefetcher, media distribution server, origin, etc.). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:

receiving a user issued request with a first identifier for requesting a first segment of particular media content, the particular media content encoding a plurality of frames;

mapping the first identifier from the user issued request to a first offset position within the particular media content, the first offset position corresponding to a first key frame of the plurality of frames at which the first segment commences, wherein a key frame can be rendered without referencing data from other frames of the plurality of frames;

extending to a second offset position that is a segment duration parameter away from the first offset position, wherein the segment duration parameter defines an approximate duration for each segment of the particular media content;

locating a second key frame of the plurality of frames that is closest to the second offset position, wherein the second key frame is separated from the first key frame by one or more other key frames;

defining a second identifier, for a prefetch request, that identifies a time or position of the second key frame; and providing the second identifier with the prefetch request, the second identifier directly matching to part of a filename of a second segment immediately following the first segment in the particular media content, wherein said providing occurs before receiving a user issued request with the second identifier.

2. The method of claim 1 further comprising prefetching the second segment in response to said providing the second identifier.

3. The method of claim 1 further comprising constructing the first segment by copying a subset of the encoding of the plurality of frames commencing at an encoding of the first key frame and extending to an encoding of the second key frame.

4. The method of claim 3 further comprising prefetching the second segment by copying a different second subset of the encoding of the plurality of frames commencing at an encoding of the second key frame and extending to an encoding of a third key frame at which a third segment commences.

5. The method of claim 4, wherein said constructing and said prefetching comprises directly copying different subsets of binary data from a complete set of binary data encoding the plurality of frames forming the particular media content.

6. The method of claim 3 further comprising serving the first segment in response to said user issued request with the first identifier.

7. The method of claim 3 further comprising passing the first segment with at least the second identifier in a header of the first segment.

8. The method of claim 7, wherein said providing comprises extracting the second identifier from said header and appending the second identifier to a base name for requesting the particular media content.

9. The method of claim 1, wherein the first offset position and the second offset position are different time or frame offsets within the particular media content.

10. The method of claim 1 further comprising scanning metadata of the particular media content using the first identifier, wherein said scanning identifies the first offset position.

11. A method for prefetching media content segments without a sequential naming convention, the method comprising:

receiving a request comprising a first identifier for a first segment of the particular media content, the first identifier corresponding to a time or position of a first keyframe in the particular media content at which the first segment begins;

passing said request to an origin storing an encoding of the particular media content;

receiving from the origin, the first segment with at least a second identifier in a header of the first segment, the second identifier corresponding to a time or position of a second keyframe in the particular media content at which the second segment begins;

serving the first segment in response to said request; and prefetching a second segment immediately after the first segment by (i) producing a prefetch request that specifies a filename comprising the second identifier and (ii) issuing the prefetch request to the origin in advance of receiving a request comprising the second identifier.

12. The method of claim 11 further comprising extracting the second identifier from said header of the first segment in advance of said serving.

13. The method of claim 11 further comprising caching in local storage, the second segment returning from the origin in response to said prefetching.

14. The method of claim 13 further comprising receiving a first request comprising the second identifier after said prefetching and caching.

15. The method of claim 14 further comprising serving the second segment from said local storage without further access to said origin in response to said first request comprising the second identifier.

16. The method of claim 11, wherein producing the prefetch request further comprises adding a header field differentiating the prefetch request from a user issued request, wherein said header field prevents further segment prefetching by the origin.

17. A device comprising:

a non-transitory computer-readable medium storing a set of processor-executable instructions; and one or more processors configured to execute the set of processor-executable instructions, wherein executing the set of processor-executable instructions causes the one or more processors to:

receive a user issued request with a first identifier for requesting a first segment of particular media content, the particular media content encoding a plurality of frames;

map the first identifier from the user issued request to a first offset position within the particular media content, the first offset position corresponding to a first key frame of the plurality of frames at which the first segment commences, wherein a key frame can be rendered without referencing data from other frames of the plurality of frames;

extend to a second offset position that is a segment duration parameter away from the first offset position, wherein the segment duration parameter defines an approximate duration for each segment of the particular media content;

locate a second key frame of the plurality of frames that is closest to the second offset position, wherein the second key frame is separated from the first key frame by one or more other key frames;

define a second identifier for a prefetch request based on a time or position of the second key frame; and provide the second identifier with the prefetch request, the second identifier directly matching to part of a filename of a second segment immediately following the first segment in the particular media content, wherein said providing occurs before receiving a user issued request with the second identifier.

* * * * *